US010764066B2

(12) United States Patent
Li et al.

(10) Patent No.: US 10,764,066 B2
(45) Date of Patent: Sep. 1, 2020

(54) EUICC SECURE TIMING AND CERTIFICATE REVOCATION

(71) Applicant: Apple Inc., Cupertino, CA (US)

(72) Inventors: Li Li, Los Altos, CA (US); Arun G. Mathias, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 462 days.

(21) Appl. No.: 15/598,220

(22) Filed: May 17, 2017

(65) Prior Publication Data

US 2017/0338966 A1    Nov. 23, 2017

Related U.S. Application Data

(60) Provisional application No. 62/338,333, filed on May 18, 2016.

(51) Int. Cl.
*H04L 9/32* (2006.01)
*H04L 29/06* (2006.01)
*H04W 12/06* (2009.01)

(52) U.S. Cl.
CPC .......... *H04L 9/3268* (2013.01); *H04L 9/3247* (2013.01); *H04L 9/3297* (2013.01); *H04L 63/0823* (2013.01); *H04W 12/06* (2013.01); *H04L 63/0853* (2013.01); *H04L 2463/121* (2013.01)

(58) Field of Classification Search
CPC ... H04L 9/3268; H04L 9/3247; H04L 9/3297; H04L 63/0823; H04L 2463/121; H04W 12/06
See application file for complete search history.

(56) References Cited

U.S. PATENT DOCUMENTS

| 8,503,376 B2* | 8/2013 | Cha | H04L 63/0428 |
| | | | 370/329 |
| 2002/0062443 A1* | 5/2002 | Lim | H04L 9/3268 |
| | | | 713/178 |

(Continued)

OTHER PUBLICATIONS

Cooper, D., et al.; Internet X.509 Public Key Infrastructure Certificate and Certificate Revocation List (CRL) Profile; Network Working Group, Standards Track; May 2008; 151 pgs.

(Continued)

*Primary Examiner* — Saleh Najjar
*Assistant Examiner* — Devin E Almeida
(74) *Attorney, Agent, or Firm* — Dickinson Wright RLLP (57) ABSTRACT

Secure reception of a certificate revocation list (CRL) is determined. In some embodiments, a device initiates a CRL update by sending a message with a timestamp to an embedded universal integrated circuit card (eUICC). The eUICC generates a session identifier, nonce, or random number and builds a payload including an internal time value based on a server time, and an internal time value based on a past message received from the device. The eUICC cryptographically signs over the payload and sends it to the device. The device obtains a CRL from a host server, checks the CRL, and, if the CRL passes the device check, sends it to the eUICC along with a second device timestamp and the nonce. The eUICC then performs checks based on the timestamps, the nonce, the CRL and the internal time values to determine whether the CRL has been securely received.

20 Claims, 8 Drawing Sheets

(56) References Cited

U.S. PATENT DOCUMENTS

| | | | | |
|---|---|---|---|---|
| 2003/0206538 A1* | 11/2003 | Rezaiifar | ............... | H04L 9/12 |
| | | | | 370/335 |
| 2007/0263869 A1* | 11/2007 | Oh | ............... | G06F 21/10 |
| | | | | 380/255 |
| 2008/0034204 A1* | 2/2008 | Lakshminarayanan | ............... | |
| | | | | H04L 63/0823 |
| | | | | 713/158 |
| 2008/0052510 A1* | 2/2008 | Kim | ............... | H04L 9/3268 |
| | | | | 713/158 |
| 2009/0113206 A1* | 4/2009 | Shen-Orr | ............... | H04L 9/3268 |
| | | | | 713/158 |
| 2011/0167258 A1* | 7/2011 | Schibuk | ............... | H04L 63/0823 |
| | | | | 713/156 |
| 2013/0227646 A1* | 8/2013 | Haggerty | ............... | H04L 63/0853 |
| | | | | 726/3 |
| 2015/0222635 A1 | 8/2015 | Yang et al. | | |
| 2016/0380980 A1* | 12/2016 | Naccache | ............... | H04L 63/0428 |
| | | | | 713/168 |
| 2017/0093800 A1* | 3/2017 | Wiseman | ............... | H04L 9/3247 |

OTHER PUBLICATIONS

Eastlake, D.; Transport Layer Security (TLS) Extensions: Extension Definitions; Internet Engineering Task Force (IETF), Standards Track; Jan. 2011; 25 pgs.

Embedded SIM Remote Provisioning Architecture; GSM Association; Official Document SGP.01; Version 1.1; Jan. 30, 2014; 85 pgs.

RSP Architecture; GSM Association; Official Document SGP.21; Version 1.0; Dec. 23, 2015; 52 pgs.

RSP Technical Specification; GSM Association; Official Document SGP.22; Version 1.0; Jan. 13, 2016; 114 pgs.

* cited by examiner

FIG. 8 ial Patent
EUICC SECURE TIMING AND CERTIFICATE REVOCATION

CROSS-REFERENCE TO RELATED APPLICATION

This application claims benefit of U.S. Provisional Patent Application No. 62/338,333, entitled "eUICC SECURE TIMING AND CERTIFICATE REVOCATION," filed on May 18, 2016, which is hereby incorporated by reference.

FIELD

The described embodiments relate to a device assisting an embedded Universal Integrated Security Card (eUICC) to securely obtain a certificate revocation list (CRL) in a public key infrastructure (PKI) environment.

BACKGROUND

Communications of an eUICC may be authenticated using PKI techniques. An eUICC is in a class of devices or components known as secure elements (SEs). The expressions eUICC, UICC, and SE are used interchangeably herein throughout. Certificates used for authentication and confidentiality purposes can be generated by a trusted certificate issuer (CI or root CA). A public-key certificate may also be referred to herein simply as a certificate.

A user may store a copy of a certificate, where the certificate holds the name of a given party (user identity). The public key recorded in the certificate can be used to check the signature on a message signed using a PKI private key of the given party. A user or message recipient may use an on-line protocol such as on-line certificate status protocol (OCSP) to determine if a certificate is valid.

A digital signature is authentication data that binds the identity of the signer to a data part of a signed message. A certification authority (CA) is a trusted third party whose signature on a certificate vouches for the authenticity of the public key of the associated user identity. If the private key of the identified user becomes compromised, all holders of the certificate need to be notified. Notification can be done, for example, with a certificate revocation list (CRL). Recipients of the CRL no longer trust messages signed with the revoked public key of the identified user. Internet Engineering Task Force (IETF) request for comments (RFC) 5280 provides an example of a CRL. For example, RFC 5280 describes a CRL for use in a PKI environment known as X.509.

Also, a public-key certificate may expire at a certain point in time. So, separate from the compromise issue, there is a need to improve recognition of expired certificates. Generally, time-variant parameters can be used in identification protocols to counteract replay attacks and to provide timeliness guarantees.

An eUICC can host profiles. A profile is a combination of operator data and applications provisioned on an eUICC in a device for the purposes of providing services by an operator. The device communicates with the eUICC over an interface. The interface can be an ISO/IEC 7816 interface. A profile can contain one or more secure data used to prove identity. An eSIM is an electronic subscriber identity module and is an example of a profile.

An eUICC includes an operating system, and the operating system can include ability to provide authentication algorithms to network access applications associated with a given operator. The operating system also can include the ability to translate profile package data into an installed profile using a specific internal format of the eUICC. A controlling authority security domain (CASD) may also be referred to as a "key store" herein. An eUICC CASE (ECASD) provides secure storage of credentials required to support the security domains on the eUICC. For example, private keys of an eUICC may be stored in the ECASD.

Some activities related to an eUICC resident in a device may be performed by the device. Examples of such activities are profile download assistance and local user interface functions. More information on profile download assistance and local user interface functions can be found in "RSP Architecture," Version 1.0, Dec. 23, 2015, Official Document SGP.21, published by the GSM Association.

SUMMARY

Representative embodiments set forth herein disclose various systems and techniques for a device assisting an embedded Universal Integrated Security Card (eUICC) to securely obtain a certificate revocation list (CRL) in PKI environments.

A device housing an eUICC initiates a CRL update of the eUICC by holding a power assertion (holding power to the eUICC in a powered-up condition), retrieving a current timestamp, T1, and sending T1 to the eUICC in a command interface message, for example, a startCRLUpdate message including a device signature, via an interface. In some embodiments the interface is an ISO 7816 interface. In some embodiments, the command interface message is cryptographically signed over, using a private key of a PKI public key-private key pair of the device, to produce the device signature.

In response to the startCRLUpdate message, the eUICC generates a nonce, for example, a random number, and creates a message payload. The message payload includes T1, the nonce, a TServer value and a TDevice value. TServer is the most up-to-date time value taken from a thisUpdate field of a CRL. TDevice is the most up-to-date verified time value received from the wireless device. The eUICC computes a cryptographic signature over the payload using a key of the eUICC. For example, the key is a private key of a PKI public key-private key of the eUICC. The eUICC sends a response message containing the response payload and the eUICC signature to the device.

The device receives the response message and checks the eUICC signature. The device stores the nonce, TDevice and TServer values. Based upon successful authentication, the device retrieves a CRL from a server hosting a CRL database. For example, the CRL can be retrieved from the server via a Transport Layer Security Hyper-Text Transport Protocol (HTTPS protocol). When the device receives the CRL from the server, the device observes the current time. The observed current time can be denoted as timestamp T2. The device, in some embodiments, performs some checks on the received CRL. For example, the device reads thisUpdate and nextUpdate fields from the CRL. The thisUpdate field contains the time at which a CI signed and published the CRL. The nextUpdate field contains a time at which the CI expects to next publish the CRL. The device expects that thisUpdate<T2<nextUpdate. If the inequality expression is not satisfied, the device, in some embodiments, discards the CRL. The device, in some embodiments, checks to see if thisUpdate>TServer (e.g., a CI-signing time occurs before a current estimate of time in the eUICC). If this inequality is not true, then the CRL received from the server is not newer than the CRL in the eUICC; in that case, the CRL is not useful to the eUICC and the device can discard it without forwarding it the eUICC.

The device performs one or more checks on the CRL. If the one or more checks indicate a problem, then the device does not forward the CRL to the eUICC. If there are no problems or if the device does not perform a check, the device creates a payload including the nonce, the CRL, and T2 and sends the payload to the eUICC in a signed update-CRL interface message over the ISO 7816 interface.

The eUICC receives the updateCRL message and attempts to validate the nonce. If the received nonce does not match the nonce sent by the eUICC in the response payload of the response message, then the CRL is suspect and can be discarded by the eUICC. Another check verifies that T2<T1+Tmax where Tmax is an upper-bound on the expected time to fetch the CRL. Tmax is a configureable parameter that, in some embodiments, represents a reasonable delay for the device to retrieve the CRL. This check determines if the CRL request has become stale. In some embodiments, Tmax is one hour. Alternatively, for example, Tmax can be one day. Similarly to the device, the eUICC expects that thisUpdate<T2<nextUpdate. If the signature authentication, the nonce, and the checks depending on T1, T2, thisUpdate and nextUpdate all pass, then the eUICC can store the CRL, update TDevice with the value T2, and update TServer with the value thisUpdate from the CRL. The eUICC can then process the CRL. The eUICC can then send an OK message to the device and the device can release the power assertion.

As a part of boot up (transitioning from a no-power to a power-on condition), the eUICC deletes T1 and the nonce for security protection.

Once a trusted timestamp, such as TDevice and/or TServer is updated in the eUICC, the eUICC can purge expired revoked certificates to save eUICC resources such as memory. In general, processing of a CRL can include, for example, identifying an identifier C1 of a public key certificate listed in the CRL and matching the public key certificate with an identifier in a trusted list. If a match is found, the trusted list is updated by removing the identifier C1 from the trusted list.

In addition, in some embodiments, the updated values of TDevice and/or TServer are used to check for expired PKI certificates stored in the eUICC. If TDevice and/or TServer has advanced to a time later than an expiration time of a PKI certificate, the eUICC can request a new PKI certificate from a CI (certificate issuer) for the server or other identity identified in the expired PKI certificate.

Some SEs are non-telecommunications SEs used in payment devices useful in financial transactions. A non-telecommunication SE, also benefits from the methods for secure timing disclosed herein. For example, an exemplary non-telecommunication SE is configured to perform one or more of the following: i) receive a message from a device housing the non-telecommunication SE to start a CRL update, ii) save a time T1 from the message, iii) generate a nonce, iv) create a reporting message including T1, the nonce, and internal time values TDevice and TServer, v) send the reporting message to the device and/or vi) receive an update CRL message including a received nonce, a CRL and a time T2. The update CRL message, in some embodiments, is signed by the device. The non-telecommunications SE, in some embodiments: i) validates the nonce, ii) compares T2-T1 to a maximum delay, iii) checks whether T2 is within a time window bounded by CRL thisUpdate and nextUpdate values, iv) processes the CRL, and/or v) and updates TDevice to T2 and TServer to thisUpdate from the CRL. The SE thus secures a financial transaction including payment.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

If an eUICC or UICC does not have a notion of time, problems can result. CRLs contain fields indicating when they are published and a time when a next CRL is expected to be published. A problem can arise if an eUICC receives an old CRL. The eUICC may not recognize that the old CRL does not indicate accurately the identities of public key certificates which should not be trusted. A second problem can occur if the eUICC has a memory storing a time value, but the eUICC receives a properly signed CRL which erroneously holds a future time value. The eUICC may then set the time value memory to the published time of the CRL, after checking the signature. Yet, because the time is in the future, some or all of the certificates in a certificate store in the eUICC may then appear to be expired. The eUICC then would purge all of the apparently-expired certificates; perhaps all of the certificates in the eUICC would be deleted. In that case, a future CRL signed by a CI would not correspond to a trusted certificate in the eUICC; the eUICC would no longer trust any entity; the eUICC would be unreachable.

By using time information both from the eUICC, the device, and a received CRL, proper CRLs can be recognized while CRLs with suspicious timing characteristics can be recognized and discarded.

PKI Environment

Figure 1:
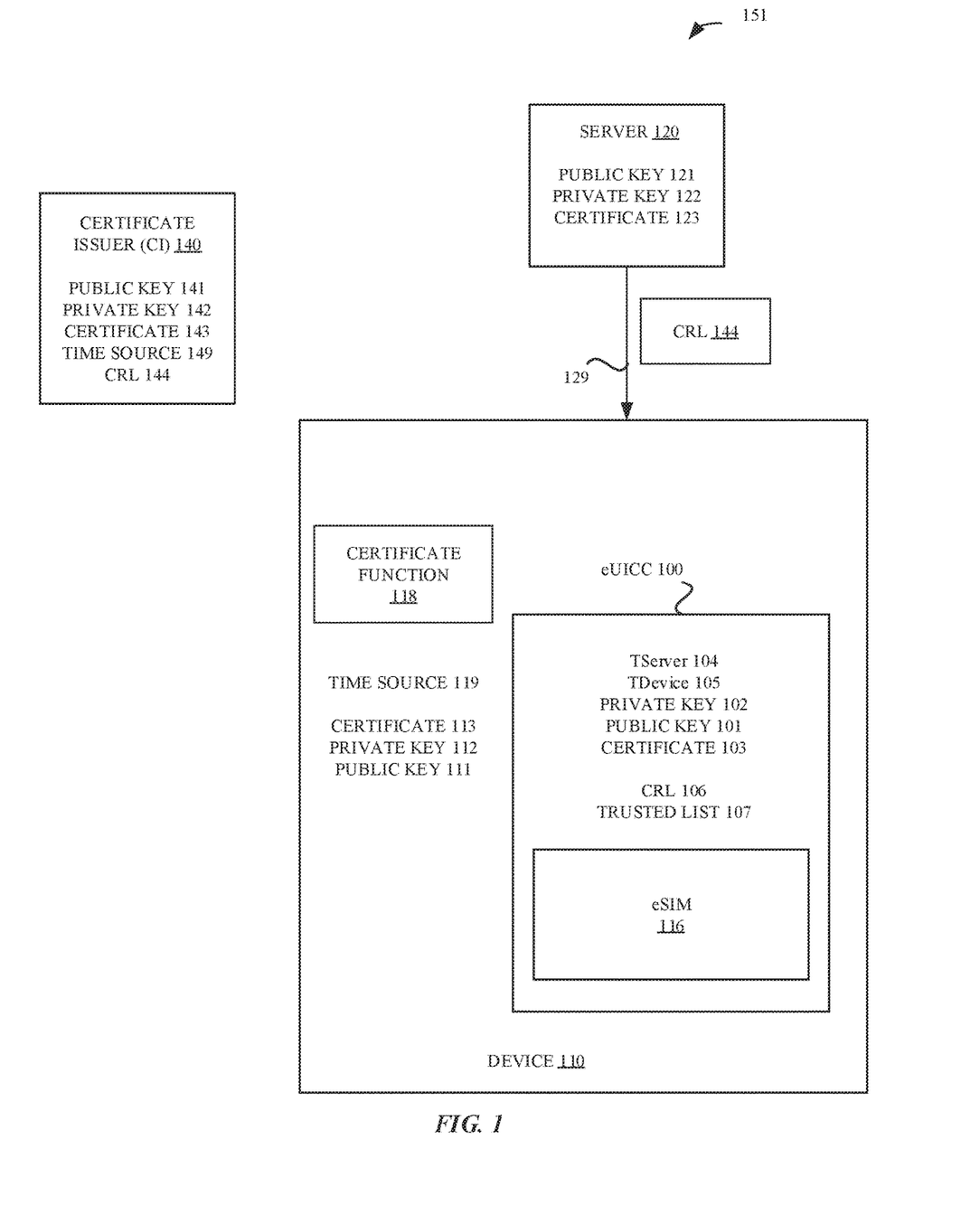
FIG. 1 illustrates a CI, a server, a device, and within the device an eUICC, according to some embodiments.

FIG. 1 illustrates a PKI environment 151 including a CI 140, a server 120, a device 110, and, within the device 110, an eUICC 100. Important information to note in FIG. 1 includes: i) the PKI public key-private key pair 141/142 and time source 149 of the CI 140, ii) the PKI public key-private key pair 111/112 and time source 119 of the device 110, and iii) the PKI public key-private key pair 101/102 and memory locations TServer 104 and TDevice 105 of the device 110. A portion of data read from a particular memory location may be referred to herein as a value. When a CRL 144, populated with time values read from the time source 149 and with the data part of the CRL signed with the private key 142, is sent by the server 120 hosting the CRL 144 to the eUICC 100 via the device 110, the eUICC 100 can execute a series of checks to determine whether the eUICC 100 has securely received the CRL 144. In some embodiments, CRL 144 is an X.509 CRL.

Further details of FIG. 1 are as follows. Certificate 143 is distributed freely and holds the public key 141 of CI 140. CI 140 cryptographically signs certificates and CRLs using the private key 142. Other parties that receive the signed CRLs, for example, are able to verify the signature using the public key 141 found in the certificate 143. Upon verifying the signature, those parties trust the CRL because they trust that only the CI 140 possesses the private key 142.

Server 120 acts as a data base or host of CRLs. Server 120 may be operated by a third party distinct from mobile network operators and device manufacturers. Server 120 may, in some scenarios, have a certificate 123 including a public key 121. Internally, the server 120 would then securely store the private key 122 corresponding to public key 121. Server 129 communicates with the device 110 over a link 129. Link 129, in some embodiments, supports, at the transport layer, HTTPS.

The device 110, in some embodiments, executes some cryptographic functions. These functions, in some embodiments are performed in an application processor by a certificate function 118. The device includes the time source 119. The time source 119 can be based on a hardware or software clock inside the device 110, or it can be based on network time information received from a cellular or WLAN operator, for example. The public key of the device is available to the eUICC 100 in the certificate 113, in some embodiments.

The eUICC 100 has a private key 102 associated with a public key 101. The certificate 103 holds a copy of the public key 101, in some embodiments. There are a number of ways for two parties to use public key algorithms for authentication; certificate-based public key algorithms are illustrated here as exemplary. The eUICC 100 includes an eSIM 116. The eSIM 116 is an exemplary actor that wishes to securely know what public keys can be trusted, and what public keys are no longer in force, for example, have been compromised by a hacker. When a hacker learns a private key, that private key is considered comprised and a signature check of a message using the public key corresponding to the comprised private key no longer proves the source of the message. The eUICC 100 can maintain a trusted list 107 and a current CRL 106. Keys and certificates can be stored in a certificate store of the eUICC 100 (not shown in FIG. 1).

Messages, Message Flow and Checks

Figure 2A:
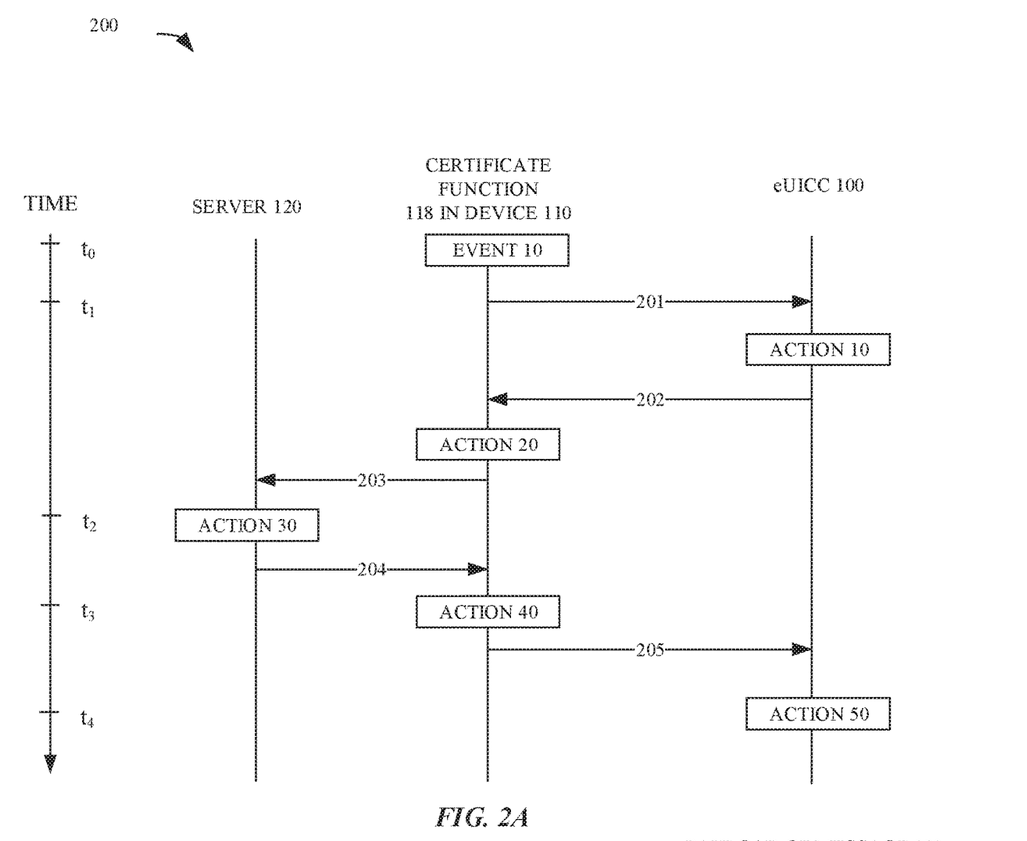
FIGS. 2A-2D illustrate a time sequence of message exchanges, actions and exemplary messages and message formats, according to some embodiments.
Figure 2B:
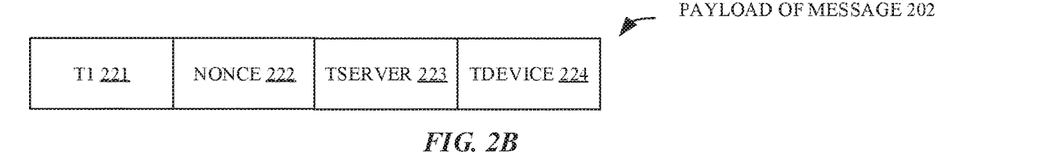
Figure 2C:
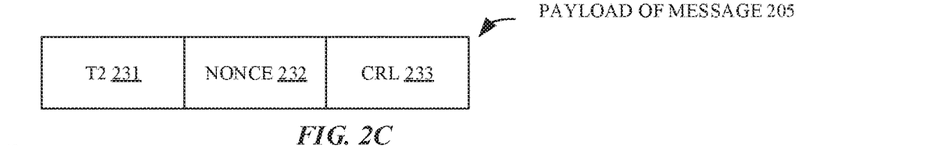
Figure 2D:
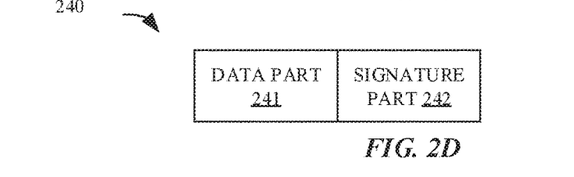

FIG. 2A illustrates a message flow between the server 120, the device 110 and the eUICC 100. A timeline is shown on the left, with time advancing from top to bottom. The entities that communicate are shown across the top, with a given vertical line providing an indication of where a particular message (indicated with a horizontal arrow) originates or terminates. The message flow begins with an event 10 at a time to in a certificate function 118 of the device 110. The certificate function 118, in some embodiments, is a software function performed by an application processor in the device 110. Event 10 is a periodic event, in some instances. Device 110 first places a power assertion in place to keep power flowing to the eUICC 100 during the CRL update process. Device 110 then sends, at a time ti, a message 201 to the eUICC 100. The message 201, in some embodiments, has a format such as that indicated in FIG. 2D. FIG. 2D illustrates a data part 241 and a signature part 242. The data part may also be referred to herein as a payload. The payload of message 201 includes a timestamp T1 read from the time source 119. Message 201 includes a signature (an instance of signature part 242 of FIG. 2D) created by the device 110 by using the private key 112 to cryptographically sign over the payload of the message 201. Any values in memory for the nonce and T1 are deleted by the eUICC 100 on boot up (transition to a power-on state).

Event 10, in some embodiments, corresponds to a financial transaction such as obtaining cash or making a payment.

The eUICC 100 performs operations referred to collectively as action 10. In particular, the eUICC 100 receives the message 201, verifies the signature, saves the value T1, and generates a nonce. The eUICC 100 then forms a response payload, illustrated in FIG. 2B including copies of values shown as i) T1 221, ii) the nonce 222, iii) TServer 223, and iv) TDevice 224. TServer may also be referred to herein as lastUpdatedServer. TDevice may also be referred to herein as lastUpdatedDevice. The eUICC 100 then creates a signature, for example by using the private key 102, and appends the signature to the response payload to create a response message 202 and sends the response message 202 to the device 110. The messages 201 and 202 are carried on, for example, an ISO 7816 interface.

The device 110 receives the response message 202 and processes it (indicated in FIG. 2A as action 20). For example, in some embodiments, the certificate function 118 checks the signature of the response message using the public key 101. If the signature check fails, the process ends.

The device, after successful signature verification, then stores the timestamp T1 221, the nonce 222, TServer 223 and TDevice 224. The device 110 then sends a CRL request (message 203 of FIG. 2A) over an HTTPS connection, for example, to the server 120. The server 120 locates the CRL 144 in its database (action 30). The server 120 then sends the CRL 144 to the device 110 in message 204.

The device 110 then, in some embodiments, performs some checks on the CRL received in the message 204 (action 40). For example, in action 40, the device 110: i) obtains the current time from the time source 119, this time is referred to herein as T2, ii) reads the thisUpdate field from the CRL 144, and iii) reads the nextUpdate field from the CRL 144. The device 110 then performs an inequality check: is the timestamp T2 greater than thisUpdate and less than nextUpdate? If T2 does not fall in this window, the device 110 can discard the CRL 144. The device 110, in some embodiments, also checks whether TServer 223<thisUpdate. When this condition is true, then CRL 144 is newer or more fresh than the CRL currently stored in the eUICC 100. If the CRL 144 is not newer, then the device 110 can skip providing the CRL 144 to the eUICC 100.

If checks applied by the device 110 to the CRL 144 all pass, then the device 110 will supply the CRL 144 to the eUICC 100, for example in an updateCRL message as indicated by message 205 in FIG. 2A. This is a signed message, for example, using the private key 112 of the device 110. Message 205 includes copies of values shown as T2 231, nonce 232, and CRL 144 in FIG. 2C. Nonce 232, from the point of view of the eUICC 100 is a received nonce. CRL 233 is a received CRL; the eUICC 100 will check the CRL 233 to see if there is an aspect that does not agree with what the eUICC 100 expects of CRL 144 coming from the CI 140.

The eUICC 100, in some embodiments, performs in action 50 one or more of the following checks using the contents of the message 205 (any check which produces an outcome of false means something is unexpected or suspicious): Check 1) the signature part of the message 205 is verifiable by the eUICC 100 using the public key 111 of the device 110, Check 2) Equality: nonce 232=nonce 222?, Check 3) T2−T1<Tmax?, where Tmax is a maximum expected delay for the device obtaining a CRL from the server, Check 4) thisUpdate<T2<nextUpdate?, and Check 5) the signature on the CRL 233 is verifiable with the public key 141 (of the CI 140)? In some embodiments, if either Check 5 (CI signature) or Check 2 (nonce) provide a result of false, the certificate function 118 declares that the CRL 233 has not been securely received. In some embodiments, if any of Check 1, Check 2, Check 3, Check 4 or Check 5 is false, the certificate function 118 declares that the CRL 233 has not been securely received. If the CRL 233 is not determined to be not securely received, then it is determined to be securely received.

If the CRL 233 is securely received, then, the CRL 233 is the CRL 144. In Action 50 the certificate function updates the field TServer 104 with the value thisUpdate from the CRL 144, updates the field TDevice with the timestamp T2 231. After the eUICC 100 determines the CRL 144 was securely received or after refreshing TServer 104 and TDevice 105, it sends an OK message to the device 110 so that the device 110 can release the power assertion. During action 50 or at a later time, the eUICC 100 processes the certificate 144 to determine if any certificates in a certificate store of the eUICC 100 are expired (based on the updated notion of time TServer, TDevice or revoked (based on the list of revoked public keys in the CRL 144).

In an exemplary method provided herein, timestamp memory locations TServer and TDevice are updated with new values. The method includes: sending, by the eUICC to a wireless device, a first message comprising a nonce; receiving, by the eUICC from a wireless device, a second message comprising a certificate revocation list, a received nonce and a wireless device timestamp; determining that a CRL has been securely received when the received nonce matches the nonce; storing a first timestamp from the CRL in the TServer memory location; and storing the wireless device timestamp in the TDevice memory location.

CRL Reception Logic

Figure 3:
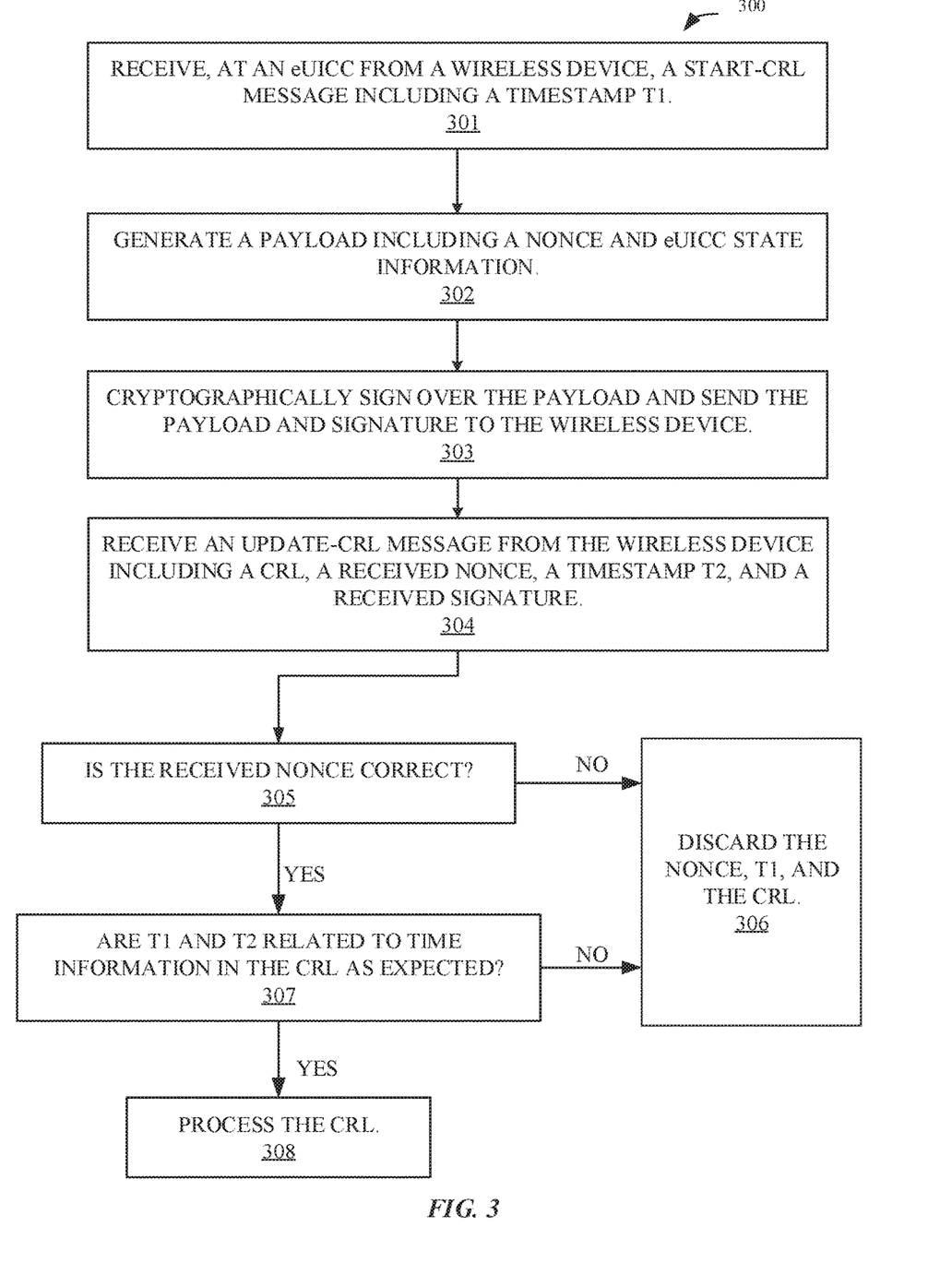
FIG. 3 illustrates exemplary logic for an eUICC receiving a message from a device. The message includes a nonce and a CRL. The eUICC verifies the nonce and time information before making use of the CRL, according to some embodiments.

FIG. 3 illustrates exemplary logic 300 for determining whether a CRL has been securely received. At 301, the eUICC receives from a wireless device, a start-CRL message including a timestamp T1. At 302, the eUICC generates a payload including a nonce and state information including values of TDevice and TServer. At 303, the eUICC cryptographically signs over the payload, for example, using a private key of a public key-private key pair of the eUICC and sends the payload and signature to the wireless device. At 304, the eUICC receives a CRL-update message from the wireless device including a CRL, a received nonce, a timestamp T2, and a received signature. At 305, the eUICC verifies the signature and compares the received nonce to the nonce that it sent at 303. If the signature is verified and the nonces match, then the logic flows to 307. Otherwise the nonce, T1, and the CRL are discarded at 306. At 307, T1 and T2 are compared with information in the CRL to detect any unexpected relationships. If T1, T2 and the information in the CRL are compatible, then the logic flows to 308, otherwise to 307. At 308, the CRL is deemed securely received and is processed.

Man in the Middle (MIM) Attack

Figure 4:
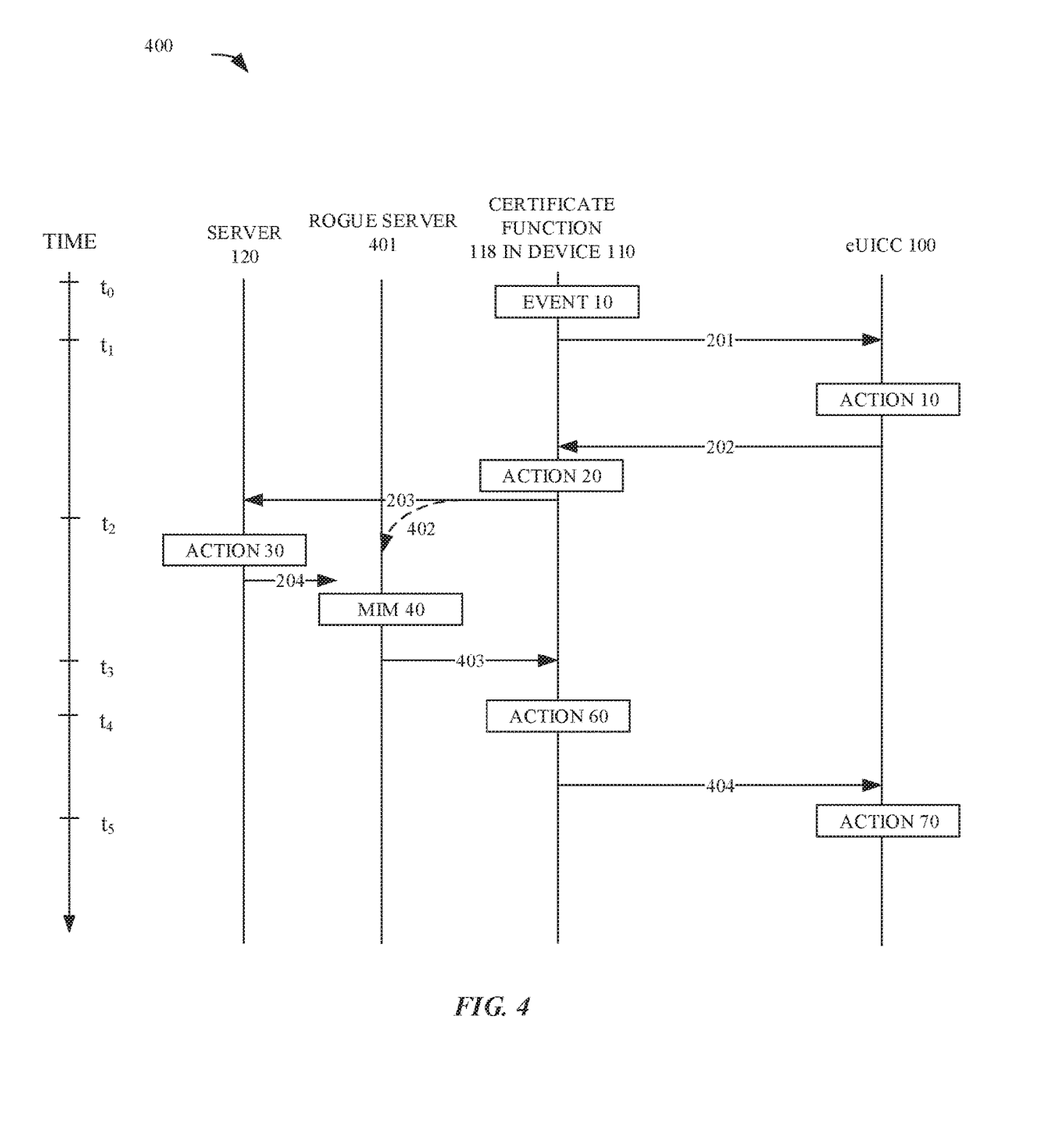
FIG. 4 illustrates exemplary message flows between a server, a device and an eUICC, according to some embodiments. A rogue server is also shown.

FIG. 4 illustrates a man-in-the-middle attack (MIM) scenario. FIG. 4 is similar to FIG. 2A, but with the addition of a rogue server 401. A rogue server 401 contains malicious software and/or has been hacked in some way. Event 10, message 201, action 10, message 202, action 20, message 203, action 30, occur in the same manner as they did in FIG. 2A. In FIG. 4, for the sake of illustration, rogue server 401 is positively present and manages to read message 203. This reading is shown as the dashed arrow 402 terminating on the rogue server 401's vertical line. The meaning of the curvature of message 402 is not to do with time, but to indicate diversion, in some sense, of the message 203 to the rogue server 401. The rogue server 401 at MIM 40 formulates a payload (in which CRL 233 of rogue server 401 is not equal to CRL 144 of server 120) and sends it as message 403 to the certificate function 118 of the device 110. This can be by an HTTPS connection. Because of the man-in-the-middle attack (MIM40), the message 204, even if sent from the server 120, does not reach device 110. A principle of security design is to study system response when something goes wrong. How the rogue server 401 receives the message 203 and manages to send the message 403 over an HTTPS connection to the device 110 is part of the erroneous state at the beginning of this message flow. The following discussion of Checks 1-5 refers to the meanings of Checks 1-5 as discussed above with respect to FIG. 2A.

The device 110 receives the message 403 and processes it at action 60. In this example, the device 110 does not detect anything wrong and forwards the CRL to the eUICC 100 in the message 404 where the eUICC process the message 404 at action 70. If the rogue server 401 is intent on a denial of service attack, it may have a CRL that is in fact signed with the private key of the CI 140. In that case, Check 5

(discussed with respect to action 50 of FIG. 2A) will provide a result of true. Since the certificate function 118 did not detect a problem, it will again provide the nonce, under signature with private key 112, to the eUICC 100 and Checks 1 and 2 will provide results of true. However, if the rogue server is slow in its attack, Check 3 will fail. If the CRL possessed by the rogue server 401 is old, Check 4 will fail. In this way, the eUICC 100 can determine that a CRL was not securely received even when the CRL has a bona-fide CI 140 signature and the device 110 does not recognize a problem.

Time Information Logic

Figure 5:
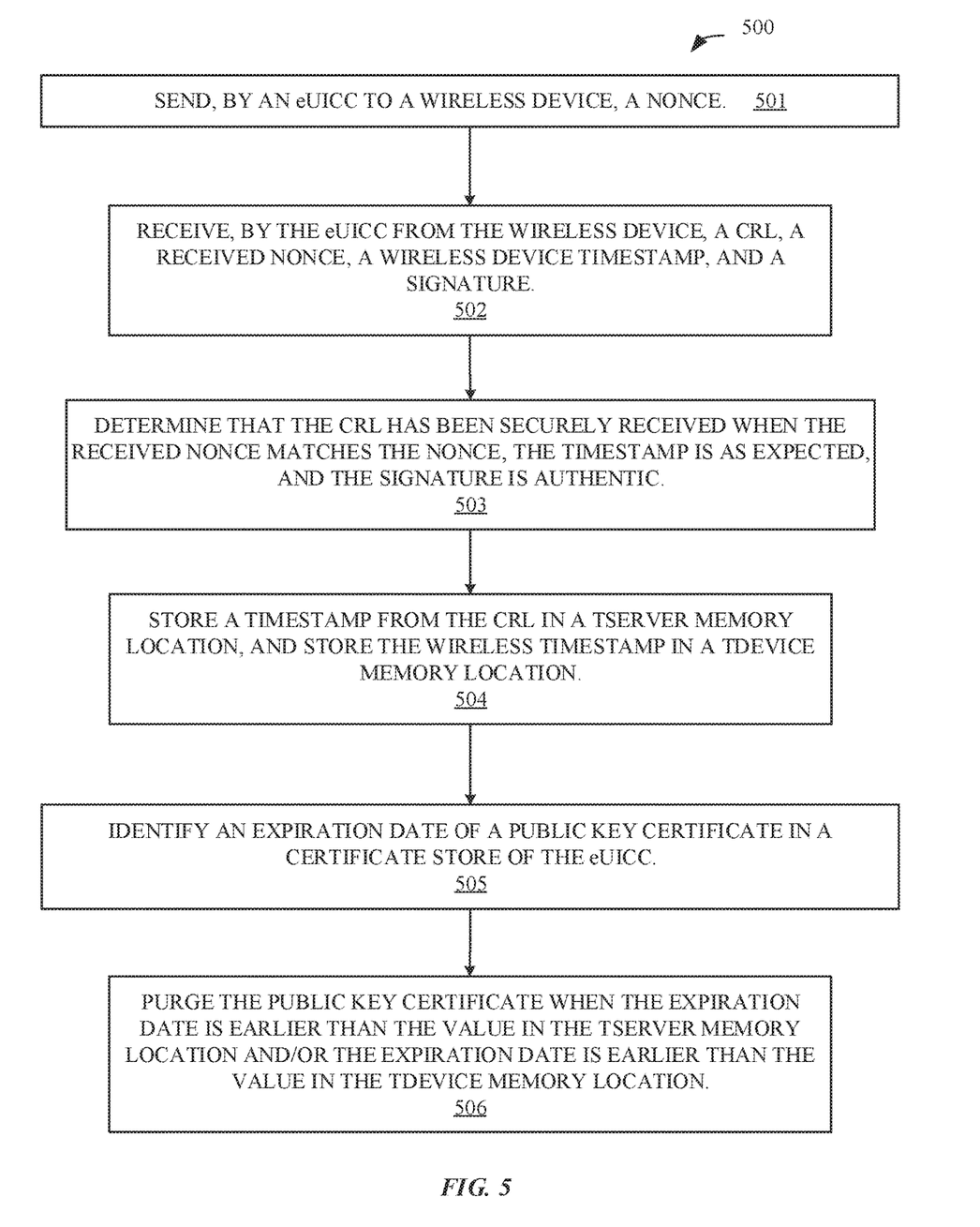
FIG. 5 illustrates exemplary logic for an eUICC determining whether a CRL has been securely received. The determination relies on time information in the certificate, information from the device and time information in the eUICC, according to some embodiments.

FIG. 5 provides exemplary logic 500 for refreshing time information in an eUICC and purging a certificate conditioned on the time information. At 501, an eUICC sends to a wireless device a nonce. At 502, the eUICC receives a CRL, a received nonce, a wireless device timestamp, and a signature. At 503, the eUICC determines that the CRL has been securely received when i) the received nonce matches the nonce, ii) the timestamp falls within an acceptable expected range, and iii) the signature is authentic (e.g., verified using public key 111 of the device 110). At 504, the eUICC stores a timestamp from the CRL in a TServer memory location and stores the wireless timestamp in a TDevice memory location. At 505, the eUICC identifies an expiration date of a public key certificate stored in the eUICC. At 506, the eUICC purges the certificate when the expiration date is earlier than the value in the TServer memory and/or the expiration date is earlier than the value in the TDevice memory location.

In an exemplary method of purging expired public key certificates, an eUICC performs operations including: sending, by the eUICC to a wireless device, a first message comprising a nonce; receiving, by the eUICC from a wireless device, a second message comprising a certificate revocation list (CRL), a received nonce and a wireless device timestamp; determining that a CRL has been securely received when the received nonce matches the nonce; storing a first timestamp from the CRL in the TServer memory location; storing the wireless device timestamp in the TDevice memory location; identifying a first public key certificate in a certificate store of the eUICC, wherein the first public key certificate includes an expiration date; and purging the first public key certificate from the certificate store when the expiration date is earlier than a first value in the TServer memory location and/or the expiration date is earlier than a second value in the TDevice memory location.

Exemplary Network System

Figure 6:
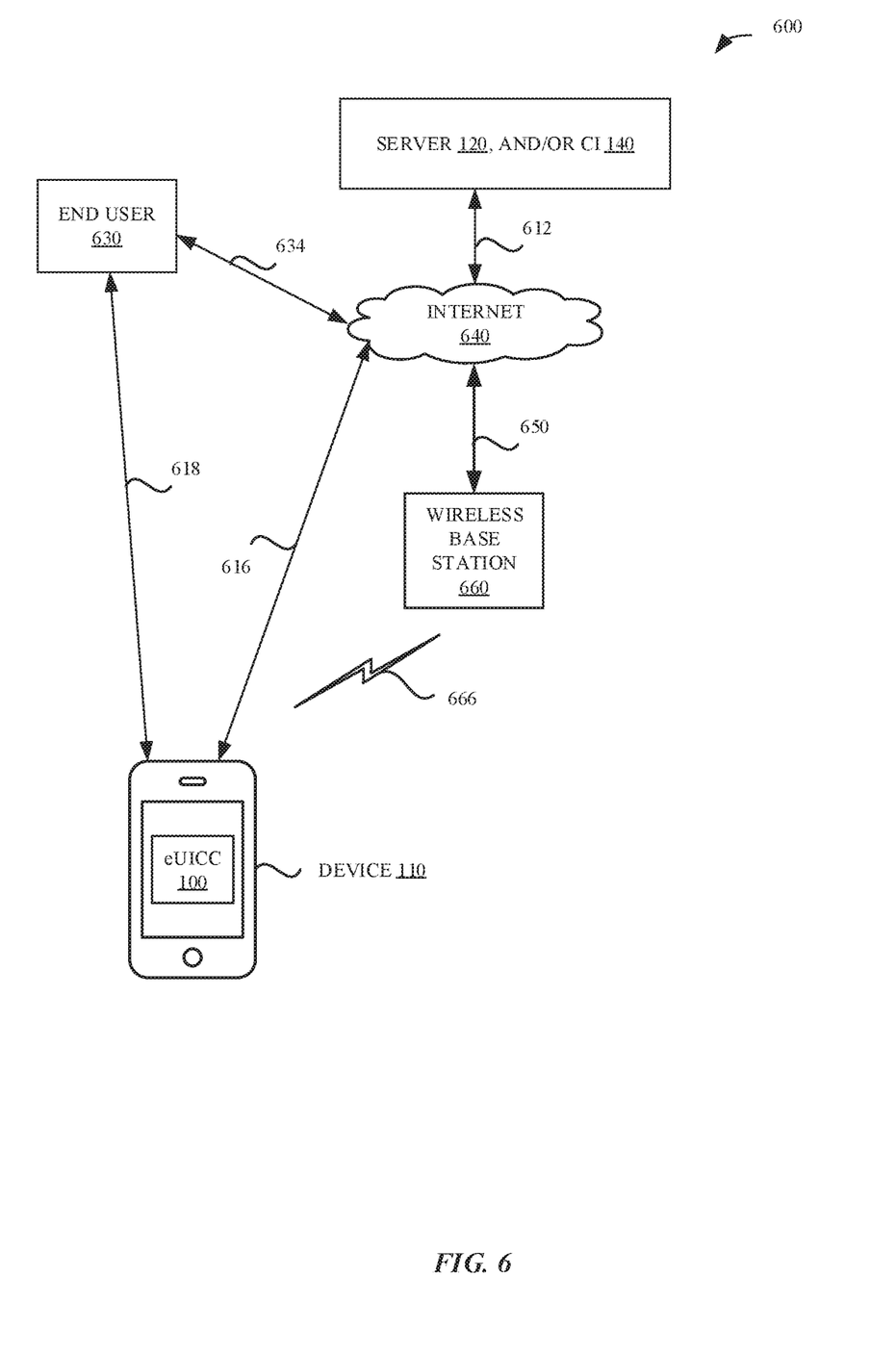
FIG. 6 illustrates an exemplary system including the device, an end user, a wireless base station, the Internet, the server and the CI, according to some embodiments.

FIG. 6 illustrates an exemplary network system 600. The eUICC 100 in the device 110 can be in communication with i) an end user 630 through interface or connection 618, with ii) the Internet 640 through a wired connection 616, and with iii) a wireless base station 660 through a radio connection 666. Wireless base station 660 is able to communicate through the Internet 640 as shown by connection 650. The CI 140, and/or the server 120, for example, can communicate with the eUICC 100 through the Internet 640.

Some eUICC Details

Figure 7:
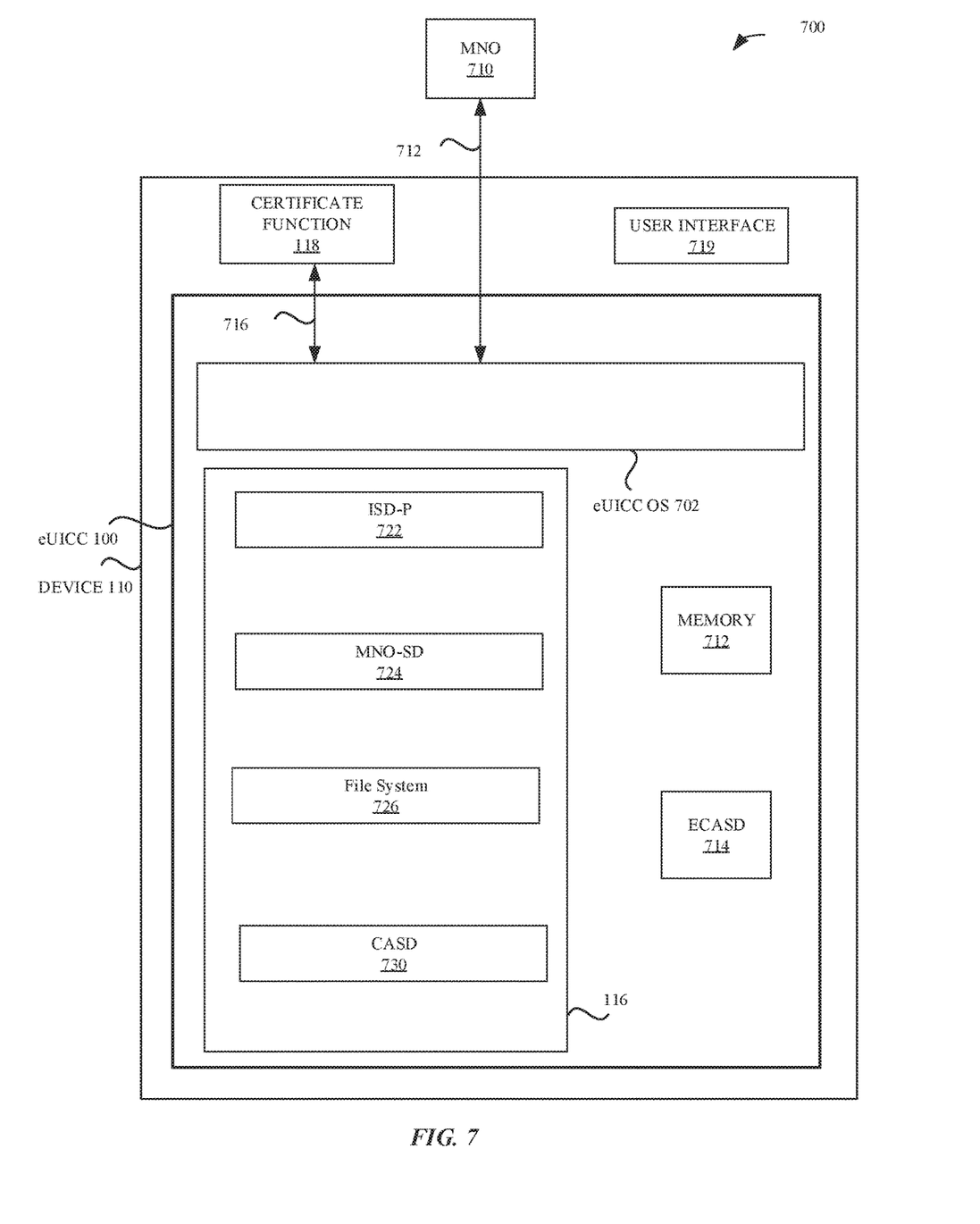
FIG. 7 illustrates exemplary internal features of the eUICC and the device, according to some embodiments.

FIG. 7 illustrates some details of the eUICC 100 in a system 700. The eUICC OS 702 may be, for example, in communication with a mobile network operator (MNO) 710. Device 110 includes, for example, the certificate function 118 in communication with the eUICC OS 702 over a trusted interface 716. Interface 716 is, in some embodiments, an ISO 7816 interface.

Non-volatile memory 712 is associated with or available for use by the eUICC 100 in order to store TServer 104, TDevice 105, CRL 106, private key 102, public key 101 and trusted list 107.

The eUICC 100 can include the eSIM 116 represented as profile 116. The profile 116 can include an ISD-P 722. An ISD-P (issuer security domain-profile) can host a unique profile. The ISD-P is a secure container or security domain for the hosting of the profile. The ISD-P is used for profile download and installation based on a received bound profile package. The profile 116 can also include an MNO-SD 724. An MNO-SD is the representative on the eUICC 100 of an MNO providing services to an end user of the device 110 (for example, MNO 710). The profile 116 can also include a file system 726 and a CASD or key store 730. Also illustrated are memory 712 and ECASD 714.

Representative Exemplary Apparatus

Figure 8:
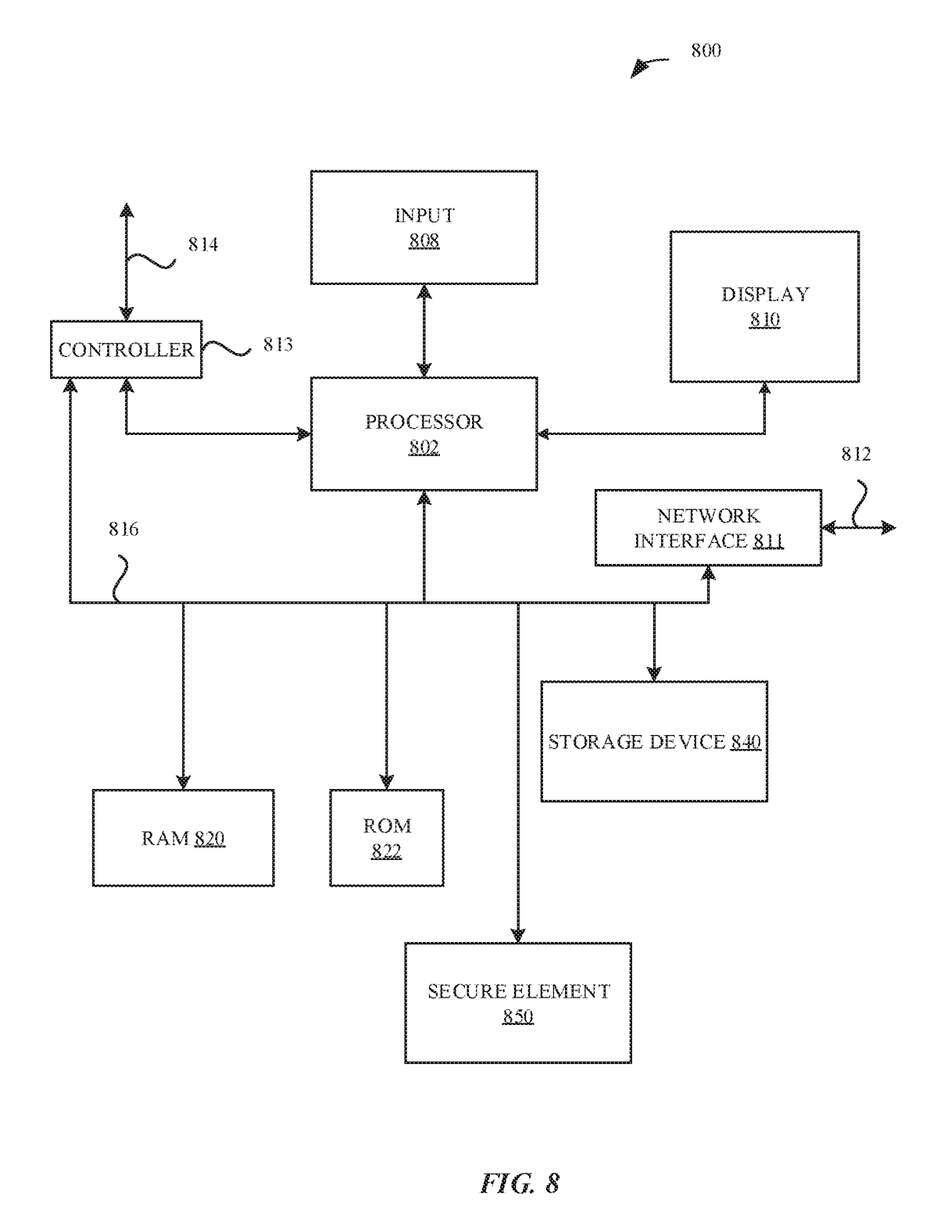
FIG. 8 illustrates an exemplary apparatus for implementation of the embodiments disclosed herein.

FIG. 8 illustrates in block diagram format an exemplary computing device 800 that can be used to implement the various components and techniques described herein, according to some embodiments. In particular, the detailed view of the exemplary computing device 800 illustrates various components that can be included in the device 110, and the eUICC 100 illustrated in one or more of FIGS. 1, 6, and 7. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 (screen display) that can be controlled by the processor 802 to display information to the user (for example, information relating to incoming, outgoing, or active communication session). A data bus 816 can facilitate data transfer between at least a storage device 840, the processor 802, and a controller 813. The controller 813 can be used to interface with and control different equipment through an equipment control bus 814. The computing device 800 can also include a network/bus interface 811 that couples to a data link 812. In the case of a wireless connection, the network/bus interface 811 can include wireless circuitry, such as a wireless transceiver and/or baseband processor. The computing device 800 also includes, in some embodiments, a secure element (SE) 850. In some embodiments, the secure element 850 is an eUICC.

The computing device 800 also includes a storage device 840, which can comprise a single storage or a plurality of storages (e.g., hard drives), and includes a storage management module that manages one or more partitions within the storage device 840. In some embodiments, storage device 840 can include flash memory, semiconductor (solid state) memory or the like. The computing device 800 can also include a Random Access Memory ("RAM") 820 and a Read-Only Memory ("ROM") 822. The ROM 822 can store programs, utilities or processes to be executed in a non-volatile manner. The RAM 820 can provide volatile data storage, and stores instructions related to the operation of the computing device 800.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.1 lax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:
1. A method comprising:
  by an embedded universal integrated circuit card (eUICC) embedded in a wireless device:
    receiving, from the wireless device, a first message initiating a certificate revocation list (CRL) update, wherein a first payload of the first message com- prises a first timestamp T1 indicating a time value when the wireless device initiated the CRL update;
generating a nonce;
generating a second payload of a second message, wherein the second payload comprises T1, the nonce, a second timestamp TServer indicating a most up-to-date time value extracted from a CRL by the eUICC, and a third timestamp TDevice indicating a most up-to-date verified time value received from the wireless device;
signing over the second payload using a private key of the eUICC to produce an eUICC signature;
sending the second message to the wireless device, wherein the second message comprises the second payload and the eUICC signature;
receiving a third message from the wireless device, wherein a third payload in the third message comprises a CRL, a received nonce, and a second signature; and
determining that the CRL has not been securely received when the received nonce from the third message does not equal the nonce generated by the eUICC and included in the second message.

2. The method of claim 1, wherein the first message comprises a device signature signed over the first payload by the wireless device using a private key of the wireless device.

3. The method of claim 1, further comprising:
when the received nonce from the third message does not equal the nonce included in the second message:
discarding T1, and
discarding the nonce.

4. The method of claim 1, further comprising:
when an expiration time of a public key certificate stored by the eUICC is earlier than TServer:
discarding the public key certificate.

5. The method of claim 1, further comprising:
when an expiration time of a public key certificate stored by the eUICC is earlier than TDevice:
discarding the public key certificate.

6. The method of claim 1, wherein the third payload comprises a fourth timestamp T2 indicating a time value when the wireless device received the CRL from a server hosting a CRL database.

7. The method of claim 6, further comprising:
determining a first difference, wherein the first difference is based on T2−T1;
comparing the first difference to a first delay, wherein the first delay represents a time needed for retrieval of the CRL from the server hosting the CRL database; and
determining that the CRL has not been securely received when the first difference exceeds the first delay.

8. The method of claim 7, further comprising:
reading a thisUpdate time field from the CRL;
reading a nextUpdate time field from the CRL;
comparing T2 with thisUpdate to produce a second difference; and
comparing T2 with nextUpdate to produce a third difference,
wherein the CRL is based on an X.509 standard.

9. The method of claim 8, wherein when: i) the nonce equals the received nonce, ii) the second signature is verified, iii) the second difference indicates that the wireless device produced T2 after receiving the CRL, and iv) the third difference indicates that the wireless device produced T2 before an expected next update time of the CRL:
determining that the CRL has been securely received.

10. The method of claim 8, wherein when: i) the second difference indicates that the wireless device produced T2 before receiving the CRL, or ii) the third difference indicates that the wireless device produced T2 after an expected next update time of the CRL:
determining that the CRL has not been securely received,
discarding T1, and
discarding the nonce.

11. The method of claim 1, further comprising:
processing the CRL to identify a first public key certificate that has been revoked, wherein the first public key certificate is associated with a first identity.

12. The method of claim 11, wherein processing the CRL comprises:
updating an untrusted list by adding the first identity to the untrusted list and/or updating a trusted list by removing the first identity from the trusted list.

13. The method of claim 11, wherein the first identity is a server identifier, a public key identifier, or a public key.

14. The method of claim 11, wherein processing the CRL comprises:
storing the CRL in a memory of the eUICC.

15. A wireless device comprising:
a processor; and
a memory, wherein the memory stores instructions that when executed by the processor cause the wireless device to perform operations comprising:
obtaining a first time value from a time source included in the wireless device, the first time value indicating a time when the wireless device initiated a certificate revocation list (CRL) update,
holding a power assertion to an embedded Universal Integrated Circuit Card (eUICC) included in the wireless device,
sending, to the eUICC, a first message initiating the CRL update, the first message comprising i) a first payload that includes the first time value and ii) a first signature over the first payload,
receiving from the eUICC a second message comprising a second payload, wherein the second payload comprises: i) a received first time value, ii) a received nonce, iii) a TServer time value indicating a most up-to-date time value extracted from a CRL by the eUICC, iv) a TDevice time value indicating a most up-to-date time value received by the eUICC from the wireless device, and wherein the second message further comprises a second signature signed over the second payload by the eUICC using a private key of the eUICC,
determining whether the second signature is valid,
when the second signature is valid:
storing the second payload,
requesting a CRL from a server hosting a CRL database,
receiving the CRL from the server,
obtaining, from the time source, a second time value indicating a time when the wireless device received the CRL from the server hosting the CRL database
reading a thisUpdate value from the CRL,
reading a nextUpdate value from the CRL,
when the second time value obtained from the time source falls in a window between the thisUpdate value and the nextUpdate value:
i) forming a third payload based on the received nonce, the CRL, and the second time value, ii) signing the third payload to form a third signature, and iii) sending a third message to the eUICC wherein the third message comprises the third payload.

16. The wireless device of claim 15, wherein the first message further comprises a device signature over the first payload signed over the first payload by the wireless device using a private key of the wireless device.

17. A method of updating timestamp memories by a secure element (SE), wherein the timestamp memories comprise a TServer memory location, and a TDevice memory location, the method comprising:

sending, by the SE to a wireless device, a first message comprising a nonce generated by the SE;

receiving, by the SE from the wireless device, a second message comprising a certificate revocation list (CRL), a received nonce, and a wireless device timestamp;

determining that the CRL has been securely received when the received nonce equals the nonce;

storing a first timestamp extracted from the CRL by the SE in the TServer memory location, the first timestamp indicating a most up-to-date time value received by the SE from a CRL database server; and storing the wireless device timestamp in the TDevice memory location, the wireless device timestamp indicating a most up-to-date verified time value received by the SE from the wireless device.

18. The method of claim 17, wherein the SE is a non-telecommunications SE.

19. The method of claim 18, wherein the first message is included in a financial transaction.

20. The method of claim 19, wherein the financial transaction includes a payment.

* * * * *

UNITED STATES PATENT AND TRADEMARK OFFICE
CERTIFICATE OF CORRECTION

PATENT NO. : 10,764,066 B2
APPLICATION NO. : 15/598220
DATED : September 1, 2020
INVENTOR(S) : Li et al.

It is certified that error appears in the above-identified patent and that said Letters Patent is hereby corrected as shown below:

In the Specification

At Column 6, Line 29: "10 at a time to in a certificate" should read -- 10 at a time $t_0$ in a certificate --.

At Column 6, Line 35: "Device 110 then sends, at a time ti," should read -- Device 110 then sends, at a time $t_1$, --.

At Column 12, Line 15: "IEEE 802.111ac; IEEE 802.1 lax;" should read -- IEEE 802.11ac; IEEE 802.11ax; --.

Signed and Sealed this
Twentieth Day of October, 2020

Andrei Iancu
*Director of the United States Patent and Trademark Office*